3,205,950
WHEELED VEHICLES CARRYING TOOL BARS FOR CULTIVATION
David Frank Howson, Brickhill, Robert Henry Marsden, Silsoe, and Henry Joel Hamblin, Putnoe, England, assignors to National Research Development Corporation, London, England, a British corporation
Filed Aug. 9, 1963, Ser. No. 301,118
Claims priority, application Great Britain, Aug. 10, 1962, 30,809/62; Sept. 24, 1962, 36,267/62
8 Claims. (Cl. 172—277)

This invention relates to wheeled vehicles of the type arranged to carry a transversely extending horizontal tool bar on which may be mounted tools for cultivating the ground. The invention is especially applicable to self propelled vehicles of the nature of agricultural tractors and will in general be described in relation to tractors hereafter, although in certain circumstances the invention could be applied to a trailer vehicle.

According to the present invention a wheeled vehicle includes a transversely extending horizontal tool bar positioned in front of the front wheel axis of the vehicle, the tool bar being carried by a support which is pivoted to the chassis of the vehicle about a transverse pivotal axis to the rear of the tool bar, upward rotational movement of the tool bar about the pivotal axis being substantially unrestricted during normal operation, and downward rotational movement of the tool bar about the pivotal axis beyond a predetermined position being limited by a stop. With this arrangement it is possible for the tool or tools carried by the tool bar to adjust themselves to their normal operating depth. When an obstruction is met the tools can ride over the obstruction without difficulty by virtue of the fact that the tool bar is carried by a pivoted support. It is thus unnecessary for the attitude of the wheeled vehicle itself to be altered as would be the case if the tool bar was held rigidly on the vehicle.

The mounting arrangement of the tool bar is of particular value when the vehicle is a self-propelled vehicle having rear wheel propulsive drive. In this case, when the tool meets an obstruction the driven rear wheels may tend to slip thus causing the rear wheels to dig themselves into the ground to a certain extent. After the digging-in has continued for a short time the stop limiting the downward rotational movement of the tool bar will be engaged and further digging-in of the rear wheel or wheels accompanied by further tilting of the vehicle in the fore and aft direction will cause the tool bar to be lifted and the depth at which the tool is running will be reduced. In extreme cases the tool may be raised completely out of the ground. Furthermore, the tilting of the vehicle due to digging-in of the rear wheels will alter the angle of attack of the tool in relation to the ground surface so that the tool will tend to rise automatically as forward movement is resumed. Such lifting of the tool will reduce the soil load imposed upon it with a consequent reduction in wheel slip of the rear wheels of the vehicle. Thus the vehicle will again begin to move and the rear wheels will climb out of the rut they have made in the ground. The vehicle will then resume a horizontal attitude but the tool bar will not be forced into the ground but because it is pivoted to the chassis of the vehicle, it will be free to take up its natural working depth again. Thus the tool is able to ride over the obstruction which led to slippage of the rear wheels of the vehicle.

It will be understood that although the invention, in its broadest aspects, may be employed on any form of tractor vehicle, in addition to the trailer vehicles referred to above, full advantage will only be derived from it in association with a rear wheel drive tractor in which the slip of the driving wheel or wheels raises the fore and aft attitude of the tractor upwardly due to digging-in of the rear traction wheel or wheels. In a preferred embodiment, the invention is employed in conjunction with a three wheeled tractor having a single driving rear wheel and two non-driven front wheels, but it will be understood that other forms of rear wheel drive tractors could well be employed, for example a four wheeled tractor having two widely spaced front wheels and two closely spaced rear wheels which are driven to provide traction and are pivotally mounted about a vertical steering axis to provide a simple form of steering.

In the case where the rear wheel drive of the tractor is effected through two driven rear wheels it is desirable that these are or can be directly interconnected. If a differential mechanism were interposed in the drive of the two driven rear wheels there would be a tendency for one of the driven wheels to slip at twice normal speed whilst the other driven wheel remained stationary so that only one of the two driven wheels could dig itself in and the self-compensating depth control effect would not be obtained.

Preferably the tool bar support includes a pair of parallel longitudinally extending side arms which are pivoted to the chassis of the vehicle. The vehicle may include a transversely extending chassis member positioned below the side arms and constituting the stop. Preferably the pivotal axis of the tool bar support is behind the front wheel axis of the vehicle. This arrangement is particularly valuable in transferring load on to the rear of the vehicle.

Preferably the pivoted support for the tool bar also carries a depth control member, for example a land wheel arranged to engage the ground in front of the tool bar so as to control the depth to which the plough or other tool can enter the ground. In use the depth control member is set so that the tool engages the ground when the cultivating tool has reached its required normal working depth with the vehicle in its normal attitude on level ground in which position there will be a small gap between the stop and the part of the pivoted assembly constituted by the tool bar and the support which co-operates with the stop.

This arrangement is particularly valuable for use with tools which produce downward reaction forces on the tool either during normal forward movement of the tool through the soil or when the tool meets obstructions. The forward end of the tool bar support is carried by the depth control member which forms a fulcrum for the support and the downward forces on the tool are transmitted by the support to the vehicle chassis through the support pivot. This pivot is behind the front wheel axis of the vehicle so the downward loads will be shared by the front and rear wheels of the vhicle in dependence on the position of the axis of the support pivot in relation to the front wheel axis and rear wheel axis of the vehicle. This arrangement has the advantage that large tools can be used for heavy cultivation of the soil while transferring at least some of the downward loads on to the rear wheels to increase the tractive power which can be transmitted through the rear wheels and to reduce the load on the front wheels which might affect the steering and stability of the vehicle.

Preferable the pivoted land wheel or other depth control member is detachably mounted on the support for the tool bar or on the tool bar itself, so that it can be removed to enable the apparatus to be used without it with implements for lighter cultivation, the tool bar support then being limited in its downward movement by the stop. With such an arrangement, the degree of slip of the rear traction wheel or wheels will again increase under increased load conditions, causing the rear wheel or wheels to dig in as previously described. This will have the effect of raising the tool bar together with the tool and altering the angle of attack of the tool relatively to the surface of the soil.

Preferably the pivoted support for the tool bar is provided with suitable lifting mechanism for swinging it upwardly about the pivotal axis of the tool bar support to raise the tool bar from its working position so that the tools will be clear of the ground. The lifting mechanism may comprise a simple manually operated lever connected to the pivoted support tool bar or the tool bar support by a ligament or linkage. Alternatively other manually operated or hydraulically operated or screw operated mechanisms may be adopted. However, various other forms of lifting mechanism devices to reduce manual effort may be devised; for example the lifting mechanism may be arranged to be actuated by the forward movement of the vehicle. In a preferred arrangement making use of the forward movement of the vehicle there is a leg pivoted to the tool bar or its support, the leg having a foot at its lower end which is moved into position to engage the ground when it is required to raise the tool bar, and a latch is provided for retaining the tool bar in a raised position. Preferably the leg has a knee joint at an intermediate point between its pivot and its foot, the whole leg being spring-biased forwardly and upwardly about its pivotal axis by a strong spring, the upper and lower parts of the leg being connected by a weaker spring which biases them towards a position in which they are in line.

When the tool bar carries one or more implements such as a plough share which produce a side draught effect the tool bar may also carry one or more devices such as tines which are shaped to produce a side draught opposing that produced by the implements. The devices may be positioned and arranged so that they break up the soil to prepare it for the plough. Preferably when the vehicle is being used with tools which produce furrows, such as plough shares, the tools are positioned so that after a number of furrows have been cut the depth control member and one of the front wheels of the vehicle lie in a furrow already cut by the share. This makes it easier for the operator to steer the vehicle.

The invention may be performed in various ways and some wheeled vehicles embodying the invention will now be described by way of example with reference to the accompanying drawings in which.

Figure 1:
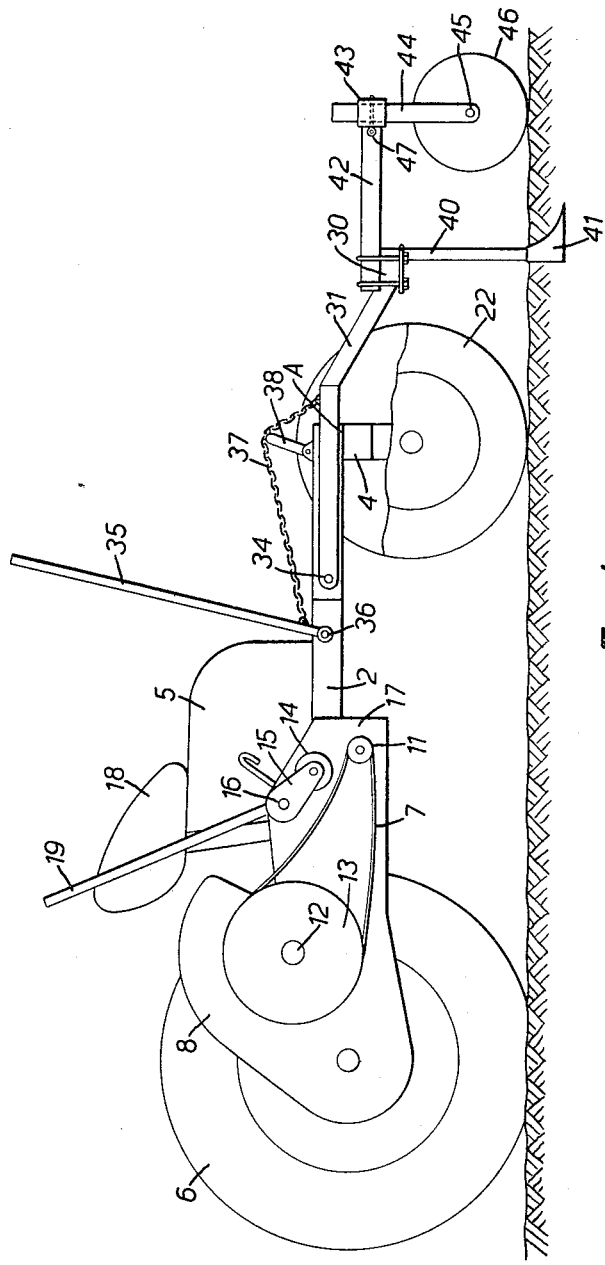
FIGURE 1 is a somewhat diagrammatic side elevation of a three wheeled tractor.
Figure 2:
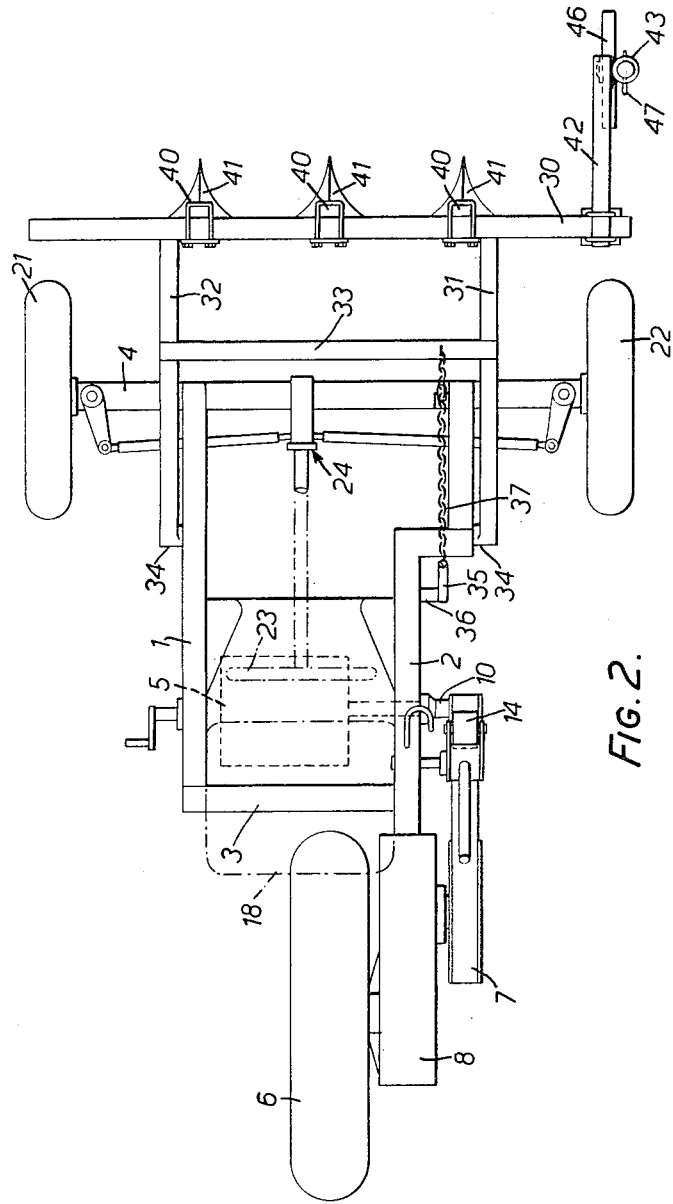
FIGURE 2 is a plan view of the tractor shown in FIGURE 1.

Referring now to FIGURES 1 and 2, the tractor includes a simple chassis of square-section tubes and comprising two side members 1 and 2, a rear cross member 3, and a front cross member 4. An engine 5 is mounted on the chassis and drives a single rear wheel 6 through a belt 7 and a gear box 8. The motor 5 has an output shaft 10 carrying a pulley 11 and the gear box has an input shaft 12 carrying a pulley 13, the belt 7 passing around the pulleys 11 and 13. The tractor is not provided with a normal clutch but the belt 7 is slack around the pulleys 11 and 13 and can be tightened when drive is required by means of an idler pulley 14 which is mounted on levers 15 pivoted at 16 to a side plate 17 secured to the chassis. The driver of the tractor, who sits on a seat 18, can control the idler pulley 14 by a control lever 19. The tractor has two front wheels 21 and 22 which can be steered by a steering wheel 23 through a linkage 24 which in only shown diagrammatically in FIGURE 2 and is omitted from FIGURE 1.

The tractor carries a horizontal transversely extending tool bar 30 which is in front of the axis of the front wheels 21 and 22. The tool bar is carried by a support constituted by a pair of side members 31 and 32 and a cross member 33. The tool bar is welded to one end of each of the side members 31 and 32 the other ends of which are connected by pivots 34 having a common horizontal axis to the side members 1 and 2 of the chassis of the tractor. The tool bar 30 can be raised by a means of a manually operated lever 35 which is pivoted at 36 to the side member 2 of the tractor chassis and is connected to the cross member 33 of the tool bar support by a chain 37 which passes over a pivotally mounted, upwardly extending lever 38 mounted on the front cross member 4 of the tractor chassis.

As shown, the tool bar 30 carries three generally vertical, downwardly extending posts 40 which carry cultivator shares 41 on their lower ends. Also rigidly secured to the tool bar 30 is a forwardly extending arm 42 to which is welded a vertical sleeve 43 in which slides a post 44, the lower end of which carries an axle 45 on which is mounted a land wheel 46. The land wheel 46 controls the depth at which the shares 41 operate and this depth can be adjusted by altering the position of the post 44 in the sleeve 43. After adjustment, a pin 47 is passed through aligned holes in the post and sleeve.

FIGURE 1 shows the relative positions of the various parts during normal operation. It will be noted that there is a gap A between the underside of the side members 31 and 32 of the tool bar support and the upper surface of the forward cross member 4 of the tractor chassis. The shape of the cultivator shares is such that during forward movement of the tractor the soil produces downward forces on the shares. The axle 45 of the land wheel 46 will act as a fulcrum for the lever formed by the tool bar support and the forwardly extending arm 42 and consequently these downward forces will be transmitted through the pivots 34 of the tool bar support to the tractor chassis. The forces will be distributed between the front wheels and the rear wheel in proportion to the distances from the pivots 34 to the front and rear wheel axes of the tractor.

If resistance to the passage of the shares through the ground increases the rear wheel will tend to slip on the surface of the soil and will tend to dig-in. Thus the tractor will tend to tilt backwards and shortly the underside of the side members 31 and 32 of the tool bar support will engage the stop formed by the forward cross member 4 of the tractor chassis. Further backward tilting of the tractor will lead to a backward tilting of the tool bar support, the tool bar and the tools. The backward tilting of the tools will tend to cause the tools to ride upwardly so that their depth of submersion will be less and the resistance to forward movement of the tractor will be reduced. If the obstruction is such that its resistance is not reduced, diggin-in of the rear wheel may continue until the shares 41 are lifted right out of the ground. When the resistance to forward movement is sufficiently reduced forward movement is resumed and the rear wheel climbs out of the rut which it has formed and the tractor resumes its horizontal attitude. However, by virtue of the pivotal mounting of the tool bar support the shares 41 are not immediately forced back into the ground but can continue to ride over the obstruction and can find their own depth independently of the attitude of the tractor as forward movement continues.

Figure 3:
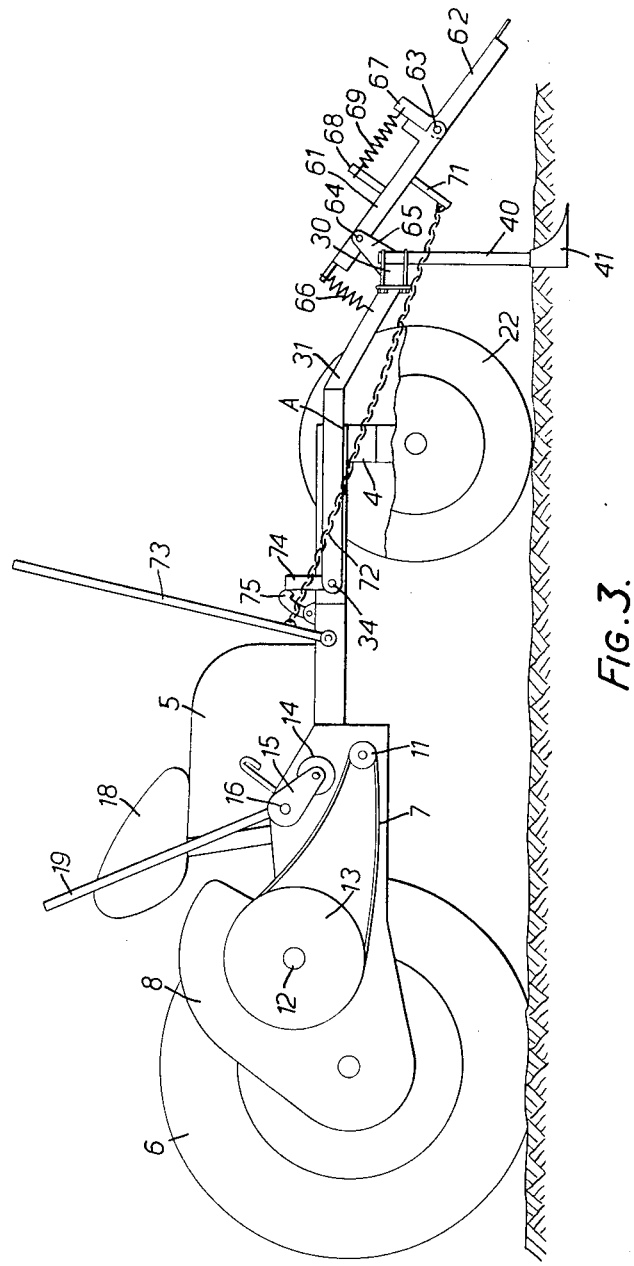
FIGURE 3 is a side elevation of a tractor similar to that shown in FIGURES 1 and 2 and provided with different means for raising the tool bar from its operative position.

The tractor shown in FIGURE 3 is similar to that shown in FIGURES 1 and 2 except that the depth control means constituted by the paths 42 to 46 is omitted and a different mechanism is employed for lifting the tool bar 30 from the ground. In the tractor shown in FIGURES 1 and 2 the tool bar 30 is lifted from the ground by the effort of the driver of the tractor. In the case of the tractor shown in FIGURE 4 the forward movement of the tractor is used to lift the tool bar. The lifting means comprises of a leg 60 having an upper part 61 and a lower part 62 connected by a knee joint 63.

The upper part 61 is mounted by a pivot 64 on a bracket 65 carried by the tool bar 30 and a strong tension spring 66 connects the upper part 61 of the leg at a point above the pivot 64 to the side member 31 of the pivoted tool bar support. The strong spring 66 pivots the leg to the position shown in FIGURE 4 in which it is out of engagement with the ground. A lug 67 projecting from the lower part 62 of the leg is connected to a lug 68 projecting from the upper part of the leg 61 by a light tension spring 69. A bracket 71 projecting from the rear side of the upper part 61 of the leg is connected by a chain 72 to a pivoted control lever 73. Rigidly secured to the side member 31 of the pivoted tool bar support is a bracket 74 which forms a detent which can engage under a pivoted latch 75 mounted on the tractor chassis.

When the tractor driver wishes to raise the tool bar from the ground he pulls the lever 73 which pivots the leg 60 about the pivot 64 in a clockwise direction as viewed in FIGURE 3 until the lower end of the leg engages the ground. Forward movement of the tractor then causes the tool bar to ride up over the leg which moves into a vertical position. When the leg is approximately vertical the detent 74 engages under the latch 75. Further forward movement will cause the leg to break at the knee joint. Release of the lever 73 will enable the strong spring 66 to return the leg 60 to the position shown in FIGURE 3, this movement being permitted by bending of the leg about the knee joint but as soon as the lower end of the leg is clear of the ground the light spring 69 will return the leg to the straight condition.

What we claim as our invention and desire to secure by Letters Patent is:

1. A wheeled vehicle including a chassis, a pair of front wheels supported on the chassis by means of a front cross member for rotation about a front wheel axis, at least one rear wheel mounted for rotation on the chassis about a rear wheel axis, means to drive said rear wheel, said front wheel axis and said rear wheel axis being in parallel vertical planes for straight forward motion of the tractor, a horizontal tool bar extending in a plane parallel with said wheel axis planes and in front of said front wheel axis, earth working means mounted on said tool bar, a tool bar support comprising side members having a horizontal portion and a forward downwardly extending portion pivotally connected to said chassis between said front and rear wheel axes, said pivotal connection permitting free pivotal movement of said tool bar support relative to said chassis about said pivotal connection in a direction to raise said tool bar, limit means mounted on said front cross member, said limit means being positioned beneath said horizontal portion of said side members to restrict movement of said tool bar beyond a pre-determined position relative to said chassis in a downward direction, an arm extending forwardly from said tool bar support, and a depth control member connected to said arm to control the normal operational height of said tool bar above said limit means, said depth control member being arranged to engage the ground in front of said tool bar.

2. A wheeled vehicle as claimed in claim 1 wherein said means to drive said rear wheel includes an engine mounted on said chassis operatively connected to said rear wheel.

3. A wheeled vehicle as claimed in claim 1 including a lifting mechanism to rotate said tool bar and said tool bar support about said pivotal connection in a direction away from said limit means.

4. A wheeled vehicle as set forth in claim 3 in which the lifting mechanism comprises a lever for manual operation and which includes a connection between said lever and said tool bar support.

5. A vehicle as claimed in claim 1 in which said depth control member is a rotatable land wheel.

6. A wheeled vehicle including a chassis, a pair of front wheels supported on the chassis by means of a front cross member for rotation about a front wheel axis, at least one rear wheel mounted for rotation on the chassis about a rear wheel axis, means to drive said rear wheel, said front wheel axis and said rear wheel axis being in parallel vertical planes for straight forward motion of the tractor, a horizontal tool bar extending in a plane parallel with said wheel axis planes and in front of said front wheel axis, earth working means mounted on said tool bar, a tool bar support comprising side members having a horizontal portion and a forward downwardly extending portion pivotally connected to said chassis between said front and rear wheel axes, said pivotal connection permitting free pivotal movement of said tool bar support relative to said chassis about said pivotal connection in a direction to raise said tool bar, limit means mounted on said front cross member, said limit means being positioned beneath said horizantal portion of said side members to restrict movement of said tool bar beyond a pre-determined position relative to said chassis in a downward direction, and means engaging the ground in front of said tool bar, operatively associated with said tool bar support for controlling the operational height of said tool bar above said limit means.

7. A wheled vehicle as claimed in claim 6 wherein said last mentioned ground engaging means comprises a rotatable land wheel operatively associated with said tool bar support.

8. A wheeled vehicle as claimed in claim 6 including a lifting mechanism to rotate said tool bar and said tool bar support about said pivotal direction away from said limit means.

References Cited by the Examiner

UNITED STATES PATENTS

| 1,185,238 | 5/16  | Pegg           | 172—236   |
| 1,361,742 | 12/20 | Porter         | 172—277   |
| 1,394,930 | 10/21 | Mott           | 172—236   |
| 1,877,777 | 9/32  | Reynolds       | 172—277   |
| 1,915,355 | 6/33  | Court et al.   | 172—277   |
| 2,163,682 | 6/39  | Heeren         | 172—276   |
| 2,404,518 | 7/46  | Moran          | 172—277   |
| 2,609,741 | 9/52  | Evenson        | 172—276   |
| 2,626,553 | 1/53  | Newlin         | 172—277   |
| 2,791,341 | 5/57  | Michaels et al.| 37—117.5 X|

FOREIGN PATENTS

| 150,832 | 4/53  | Australia.     |
| 980,307 | 12/50 | France.        |
| 659,422 | 10/51 | Great Britain. |

ABRAHAM G. STONE, *Primary Examiner.*

T. GRAHAM CRAVER, *Examiner.*